United States Patent
Ting

(10) Patent No.: US 7,534,119 B2
(45) Date of Patent: May 19, 2009

(54) STACKED CARD CONNECTOR HAVING EJECTING MECHANISM

(75) Inventor: Chien-Jen Ting, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/148,827

(22) Filed: Apr. 23, 2008

(65) Prior Publication Data

US 2008/0261423 A1 Oct. 23, 2008

(30) Foreign Application Priority Data

Apr. 23, 2007 (TW) ............... 96114192 A

(51) Int. Cl.
*H01R 13/62* (2006.01)
(52) U.S. Cl. .................... 439/159; 439/541.5
(58) Field of Classification Search .......... 439/541.5, 439/159, 160
See application file for complete search history.

(56) References Cited

U.S. PATENT DOCUMENTS

| | | | |
|---|---|---|---|
| 6,379,163 B1 * | 4/2002 | Yu | 439/95 |
| 6,648,680 B1 * | 11/2003 | Hu | 439/541.5 |
| 7,018,234 B2 * | 3/2006 | Tanigawa et al. | 439/541.5 |
| 7,052,316 B2 * | 5/2006 | Tanigawa et al. | 439/541.5 |
| 7,059,910 B1 * | 6/2006 | Chang | 439/630 |
| 7,086,906 B1 * | 8/2006 | Ting | 439/630 |
| 7,101,222 B2 * | 9/2006 | Ho et al. | 439/541.5 |
| 7,108,545 B2 * | 9/2006 | Ting | 439/541.5 |
| 7,189,088 B2 * | 3/2007 | Cheng et al. | 439/159 |
| 2005/0026485 A1 * | 2/2005 | Muramatsu et al. | 439/159 |
| 2005/0118863 A1 * | 6/2005 | Tanigawa et al. | 439/541.5 |
| 2006/0128189 A1 | 6/2006 | Kuo | |
| 2006/0134976 A1 * | 6/2006 | Cheng et al. | 439/541.5 |
| 2006/0178045 A1 * | 8/2006 | Ting | 439/541.5 |
| 2006/0286835 A1 * | 12/2006 | Cheng et al. | 439/159 |
| 2008/0207012 A1 * | 8/2008 | Cheng et al. | 439/64 |
| 2008/0254659 A1 * | 10/2008 | Ting | 439/159 |
| 2008/0261423 A1 * | 10/2008 | Ting | 439/159 |
| 2008/0261424 A1 * | 10/2008 | Ting | 439/159 |
| 2008/0261442 A1 * | 10/2008 | Ting | 439/541.5 |
| 2008/0268682 A1 * | 10/2008 | Ting | 439/159 |
| 2008/0268683 A1 * | 10/2008 | Ting | 439/159 |
| 2008/0268684 A1 * | 10/2008 | Ting | 439/159 |
| 2008/0280468 A1 * | 11/2008 | Ting | 439/160 |

(Continued)

*Primary Examiner*—Ross N Gushi
(74) *Attorney, Agent, or Firm*—Wei Te Chung

(57) ABSTRACT

A stacked card connector (1) includes a first connector (10) and a second connector (20). The first connector includes a first insulating housing (30) having a base section (31) and a base seat (33) extending laterally from the base section, a first metal shell (11) covering the first insulating housing and defining a first receiving space (14), a plurality of first terminals (4) retained in the base section for connecting to a first card, and a first ejecting mechanism (6) and a second mechanism (5) located on the base seat. The second connector includes a second insulating housing (22) located under the first insulating housing, a plurality of second terminals (24) receiving in the second insulating housing for engagement with the second card which is received in a second receiving space defined by the second connector. The first ejecting mechanism and the second ejecting mechanism extend into the first receiving space and the second receiving space, respectively, to remove the first card and the second card in a fitting/ejecting direction.

17 Claims, 7 Drawing Sheets

U.S. PATENT DOCUMENTS

2008/0280487 A1* 11/2008 Ting ......................... 439/541.5
2008/0299806 A1* 12/2008 Hsiao ......................... 439/159
2008/0299807 A1* 12/2008 Ting ........................... 439/159

* cited by examiner

STACKED CARD CONNECTOR HAVING EJECTING MECHANISM

BACKGROUND OF THE INVENTION

1. Field of the Invention

The present invention relates to a card connector, and particularly to a stacked card connector comprising two ejecting mechanisms. The present application relates to a copending application titled "CARD CONNECTOR" with the same inventor and the same filing date.

2. Description of Prior Arts

Memory cards are known in the art and contain intelligence in the form of a memory circuit or other electronic program. Some form of card reader reads the information or memory stored on the card. Memory cards are used in many applications in today's electronic society, including video cameras, smartphones, music players, ATMs, cable television decoders, toys, games, PC adapters and other electronic applications. A typical memory card includes a contact or terminal array for connection through an electrical connector to a card reader system and then to external equipment. The connector readily accommodates insertion and removal of the card to provide quick access to the information and program on the card. The card connector includes terminals for yieldably engaging the contact or terminal array of the card. Additionally, the connector always has an ejecting mechanism for ejecting the insertion card out.

The prior art discloses a card connector that has a first connector and a second connector stacked with the first connector. Each connector has an ejecting member mounted on a lateral side thereof, and each ejecting mechanism comprises a pushing bar operated by a user, and an ejecting bar engaging with a card directly for ejecting the card.

However, such card connector is mounted in an electronic equipment, the long pushing bar of the ejecting mechanisms occupy a big space of the internal space of the electronic equipment. Moreover, the mechanism is disposed on the lateral side of the card connector, and there is no additional member to cover thereon completely. Therefore, an interference will be encountered to the ejecting mechanism by other external equipments.

Therefore, the present invention is directed to solve these various problem by providing a card connector which reduces the overall size of the connector and achieves a stable electrical mechanism.

SUMMARY OF THE INVENTION

An object, therefore, of the invention is to provide a card connector that is capable of preventing an interference encountering between an ejecting mechanism and other external equipments and, further, that can be reduced in size.

In the exemplary embodiment of the invention, a stacked card connector includes a first connector and a second connector. The first connector includes a first insulating housing having a base section and a base seat extending laterally from the base section, a first metal shell covering the first insulating housing and defining a first receiving space, a plurality of first terminals retained in the base section and having a first transmission speeds for connecting to a first card which is received in the first receiving space and a first ejecting mechanism and a second mechanism located on the base seat. The second connector includes a second insulating housing located under the first insulating housing, a plurality of second terminals receiving in the second insulating housing for engagement with the second card which is received in a second receiving space defined by the second connector. Wherein the first ejecting mechanism and the second ejecting mechanism extend into the first receiving space and the second receiving space, respectively, to remove the first card and the second card in a fitting/ejecting direction.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
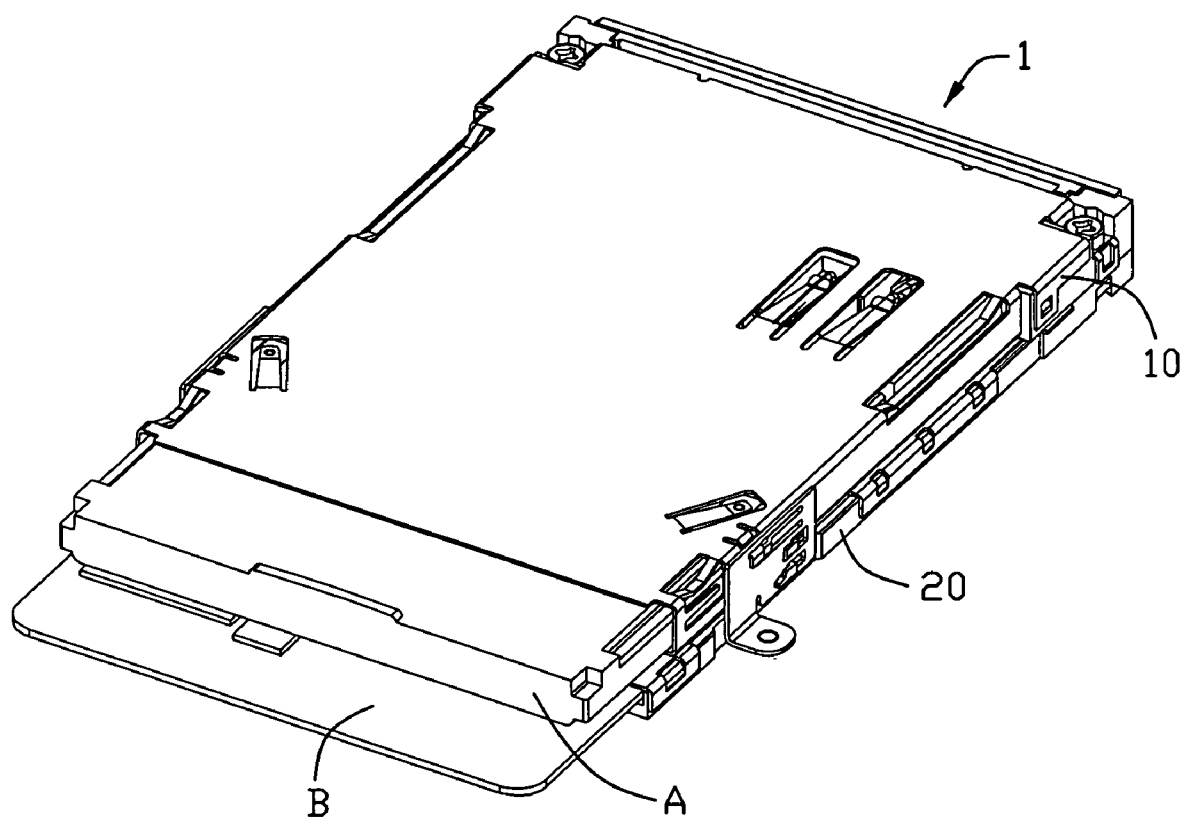
FIG. 1 is a perspective view of a card connector of present invention.

Referring to FIG. 1 to FIG. 7, the present invention provides a card connector 1 which is used for a connection with two cards having mutually different transmission speeds, such as an Express card, and a Smart card. The card connector 1 comprises a first connector 10 defining a first receiving space 14 for receiving a first card A, a second connector 20 stacked with the first connector 10 and defining a second receiving space 220 for receiving a second card B, and an opening (not labeled) for a card inserting/ejecting.

Figure 2:
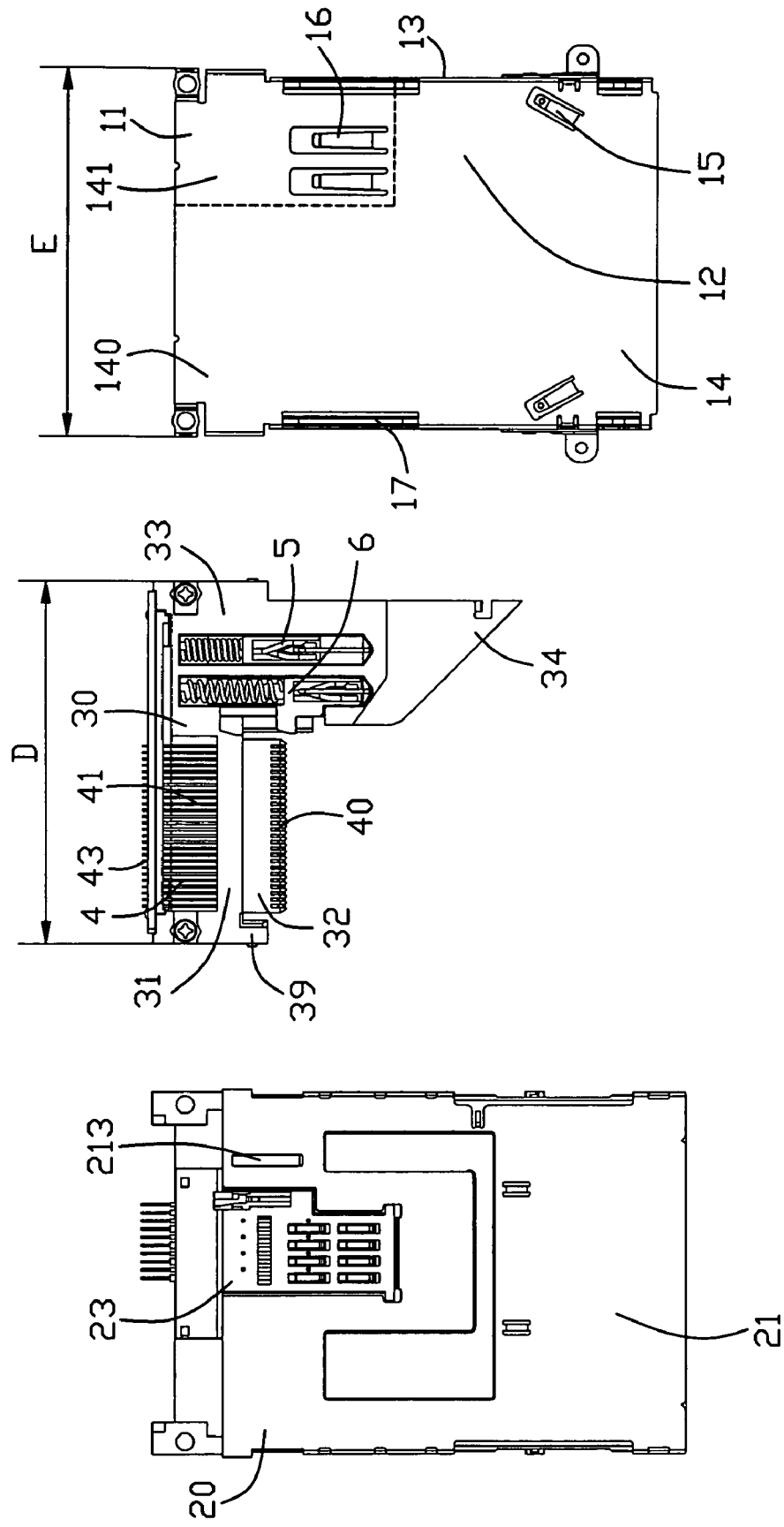
FIG. 2 is an exploded and top elevation view of the card connector of present invention as shown in FIG. 1.

As shown in FIG. 1 and FIG. 2, the first connector 10 comprises a first metal shell 11, an insulating housing 30 covered by the first shell 11, a plurality of first terminals 4 protruding into the first receiving space 14 to engage with the first card A, a first ejecting mechanism 6 and a second ejecting mechanism 5 for ejecting the first card A and the second card B, respectively.

The first shell 11, approximate a rectangular shape in a top plan view, and an U shape in a front view, comprises a first top wall 12, and a pair of first lateral walls 13 extending downwardly from the opposite sides of the first top wall 12. The first receiving space 14 is defined by the first top wall 12 associating with the first lateral walls 13 and is divided into an L-shape card slot 140 to receive the first card A and a rectangular space 141, as a broken line shown in FIG. 2. When the first card A is received in the card slot 140, the rectangular space 141 is rightly accommodated to a cut portion F (shown in FIG. 7) of the first card A. The first top wall 12 has a pair of first elastic pieces 15, a pair of second elastic pieces 16, and a pair of first projecting portions 17. A sharp angle is existed between each elastic pieces 15 and an insertion direction of the card. The elastic pieces 15 are used for pressing on a metal part C (shown in FIG. 7) of the first card A acting as a grounding portion and a fastening portion. The first projecting portions 17 are provided to guide the first card inserted stably. The second elastic pieces 16 extend along the insertion direction of the card and located at the rectangular space 141.

Figure 3:
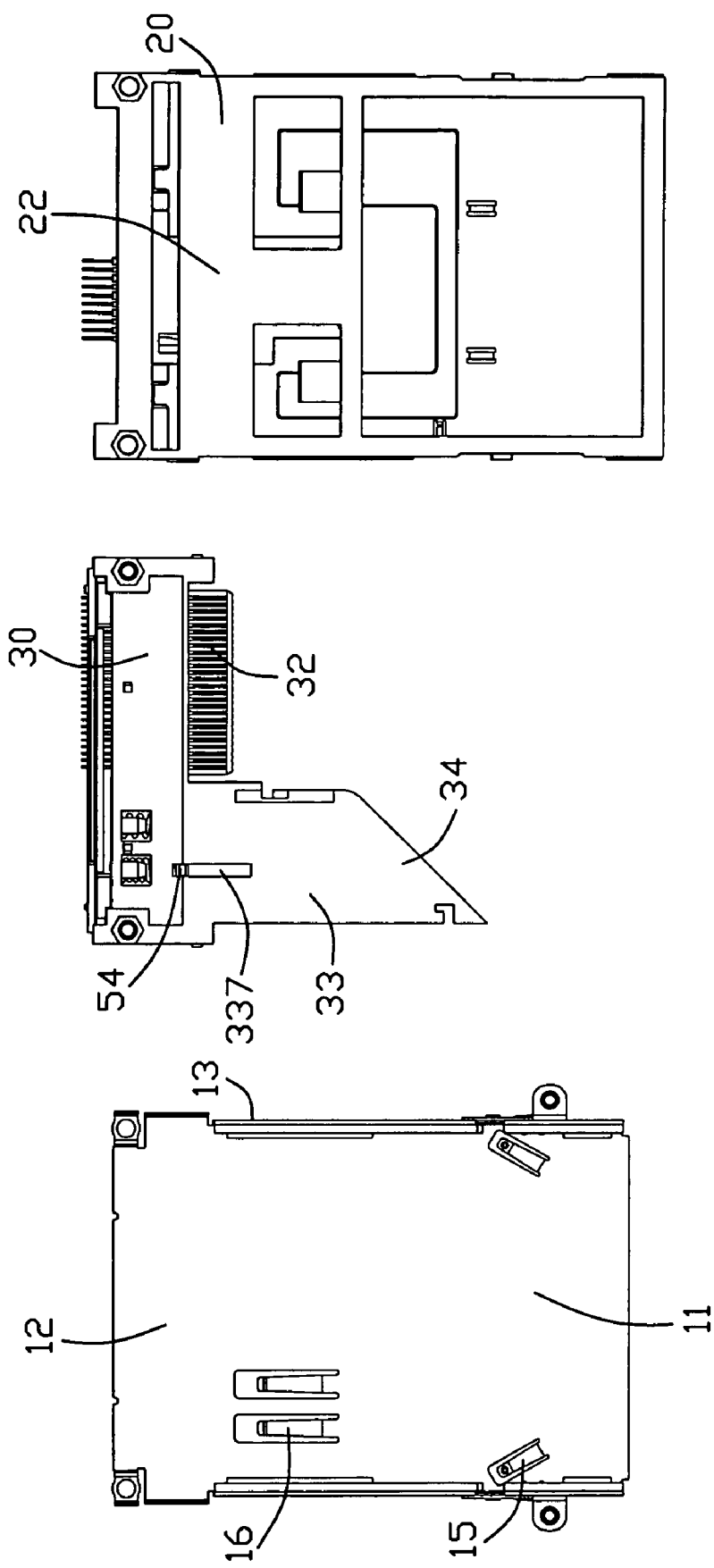
FIG. 3 is a bottom view of the card connector as shown in FIG. 2.
Figure 4:
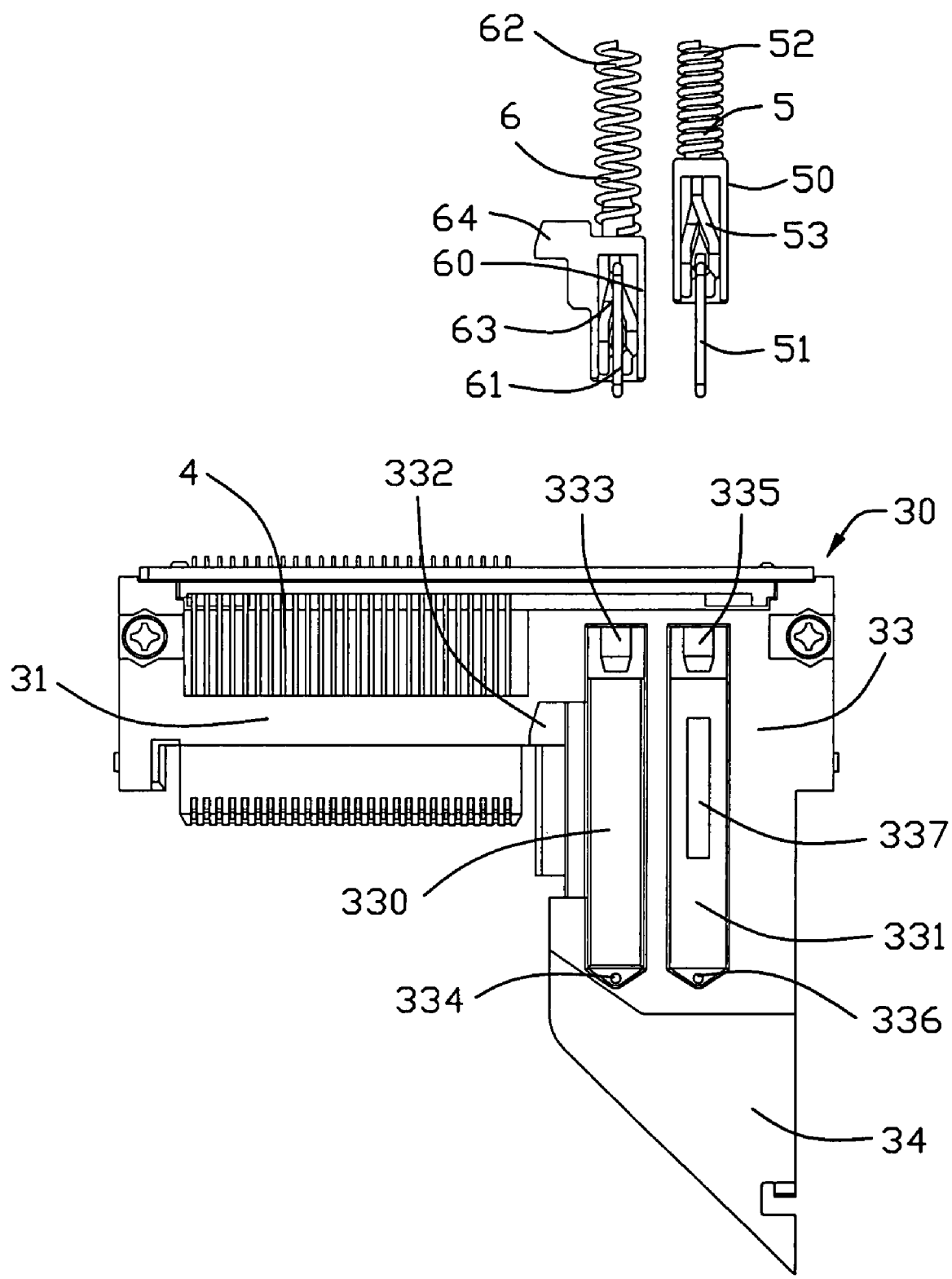
FIG. 4 is a top plan view of a first ejecting mechanism, a second ejecting mechanism and an insulating housing of the card connector according with present invention.

Referring to FIG. 2 to FIG. 4, the first insulating housing 30, structured as an L shape in a top elevation view, comprises a base section 31 and a base seat 33 extending laterally from the base section 31. Getting along a transverse direction perpendicular to the insertion direction of the card, a width D defined by the base section 31 associating with the base seat 33 is approximately equivalent to the width E of the first shell 11. The base section 31 has a main portion (not labeled), an arm portion 39 at one end of the main portion, an engaging plate 32 extending from the main portion and parallel to the arm portion 39. The first contacts 4 are received in the main portion and the engaging plate 32, and each contact 4 comprises an engaging portion 40, a soldering portion 43 and a connecting portion 41 joining the engaging portion 40 with the soldering portion 43.

The base seat 33, designed approximately in a rectangular shape and longer than the base section 31 along the insertion direction of the card, has a first sliding groove 330 and a second sliding groove 331 parallel to the first sliding groove 330. The first sliding groove 330 and the second sliding groove 331, respectively, have a post 333, 335 at one end thereof, and a position hole 334, 336 opposite to corresponding post 333, 335. Particularly, the first sliding groove 330 and the second sliding groove 331 have a first sliding channel 332 and a second sliding channel 337, respectively. The first sliding channel 332 is formed at one edge of the first sliding groove 330, and the second sliding groove 337 is formed at the bottom of the second sliding groove 331 to communicating with the second receiving space 220. Moreover, in this embodiment of the present invention, the base seat 33 has a triangle plate 34 extending therefrom forwardly and integrally to guide different card inserting.

As shown in FIG. 4, the first mechanism 6 and the second mechanism 5 are structured almost the same as each other and operated by an inserting card, and comprise, respectively, a first ejecting member 60, a second ejecting member 50 protruding into corresponding receiving space, a first spring member 62, a second spring member 52 for moving the ejecting member 60, 50 towards the card ejecting direction, a first heart groove 63, a second heart groove 53 and a first latch member 61, a second latch member 51 sliding in the heart groove 63, 53 to overcome the spring member 62, 52 and take the ejecting member 60, 50 in a desirable position. The first ejecting member 60 and the second ejecting member 50, respectively, have a first pushing portion 64 extending laterally from one side of the first ejecting member 60, a second pushing portion 54 (shown in FIG. 6) extending downwardly from a bottom of the second ejecting member 50.

Figure 5:
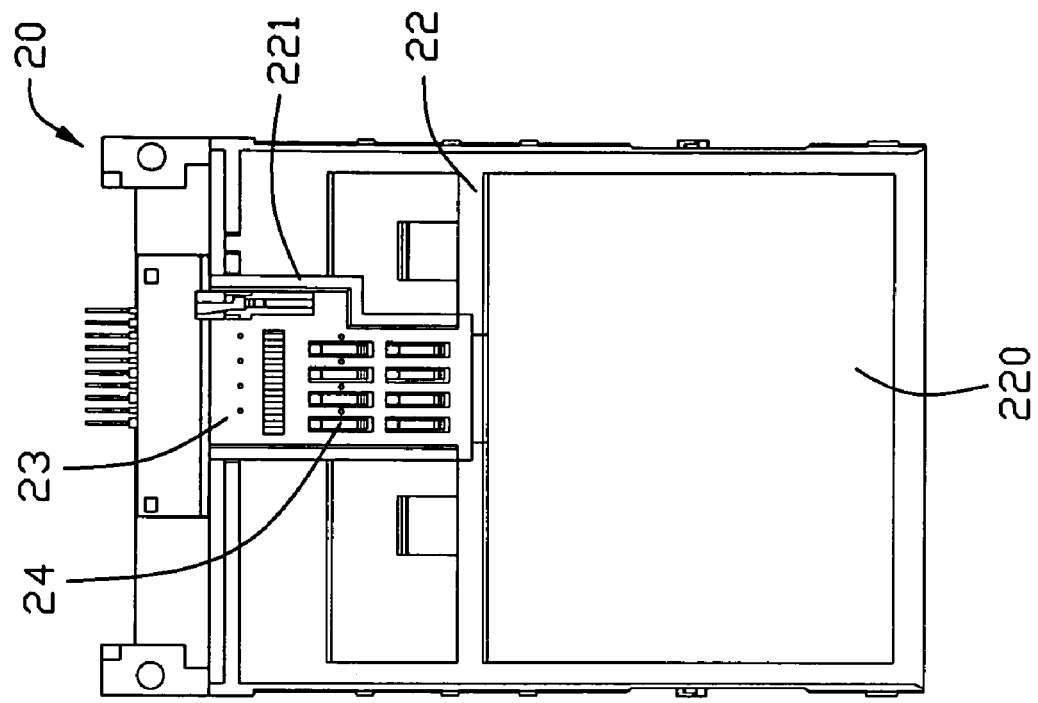
FIG. 5 is an exploded and top plan view of a second connector of the card connector according with present invention.
Figure 5:
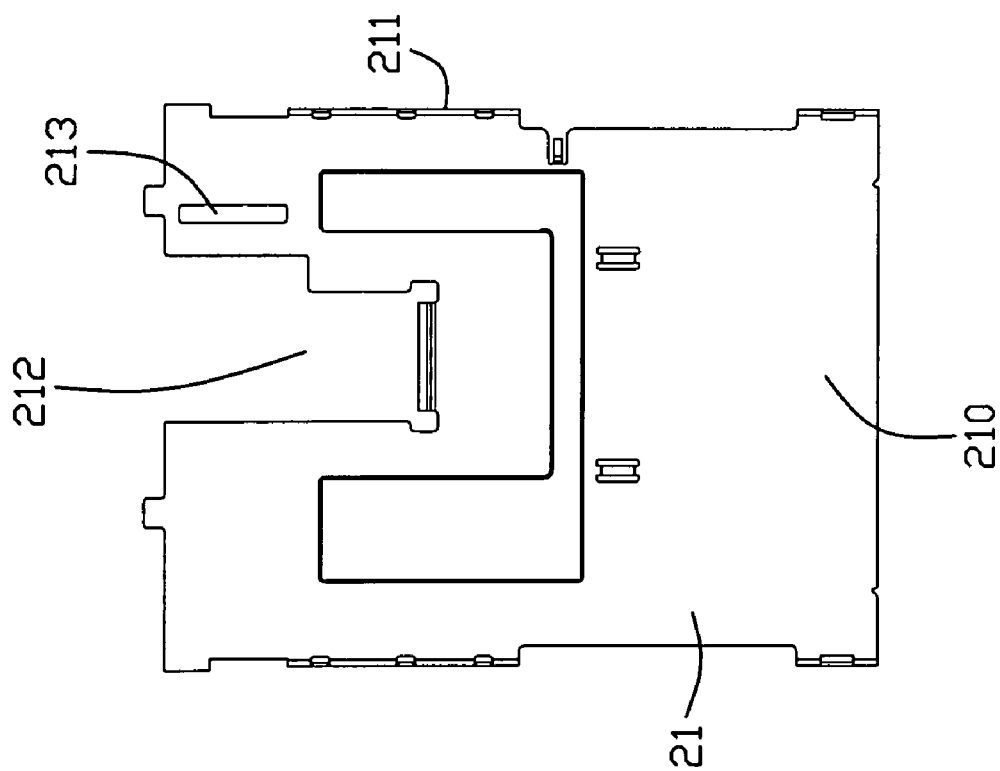

Together with FIG. 2, FIG. 3 and FIG. 5, the second connector 20 is placed under the first connector 10 respect to a printed circuit board (not shown) and comprises a second metal shell 21, a terminal module 23 aligned with the second shell 21, and a second insulating housing 22 associating with the second shell 21 to define the second receiving space 220.

The second shell 21 is approximately a rectangular shape, and comprises a second top wall 210, a pair of second side walls 211 extending downwardly from opposite sides of the top wall 210. The second top wall 210 has a fixing hole 212 in alignment with the terminal module 23, and a longitudinal groove 213 in accordance with the second slipping groove 337 of the second guiding groove 331.

The second insulating housing 22 is constructed according to the second shell 21, and comprises a recess 221 to receiving the terminal module 23. In the terminal module 23, a plurality of second terminals 24 is retained and protrudes upwardly into the second receiving space 220 to engaging with the second card B electrically.

Figure 6:
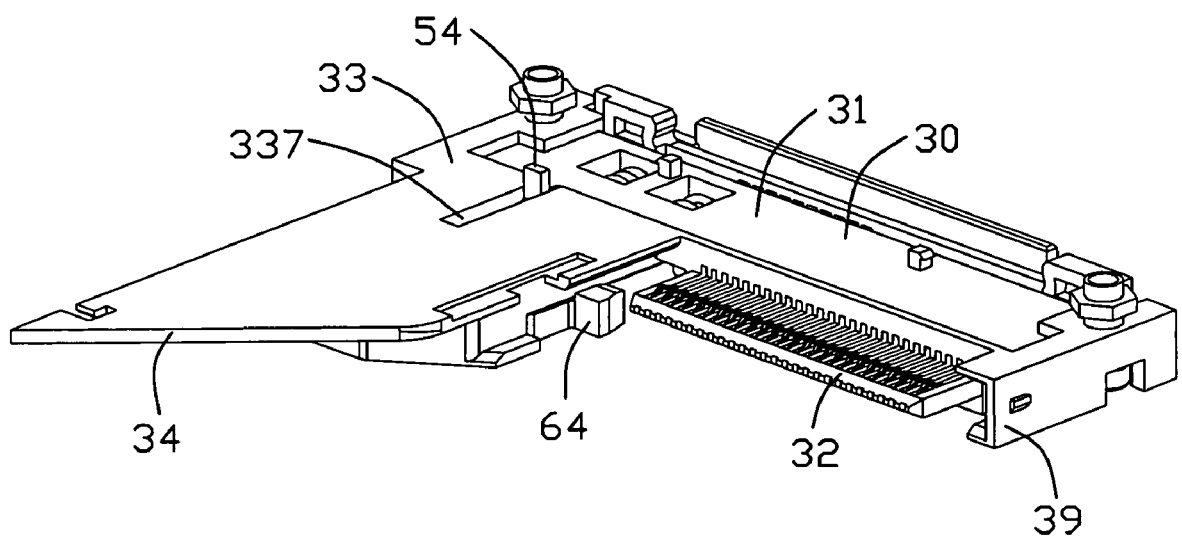
FIG. 6 is a perspective view of the insulating housing of the card connector.
Figure 7:
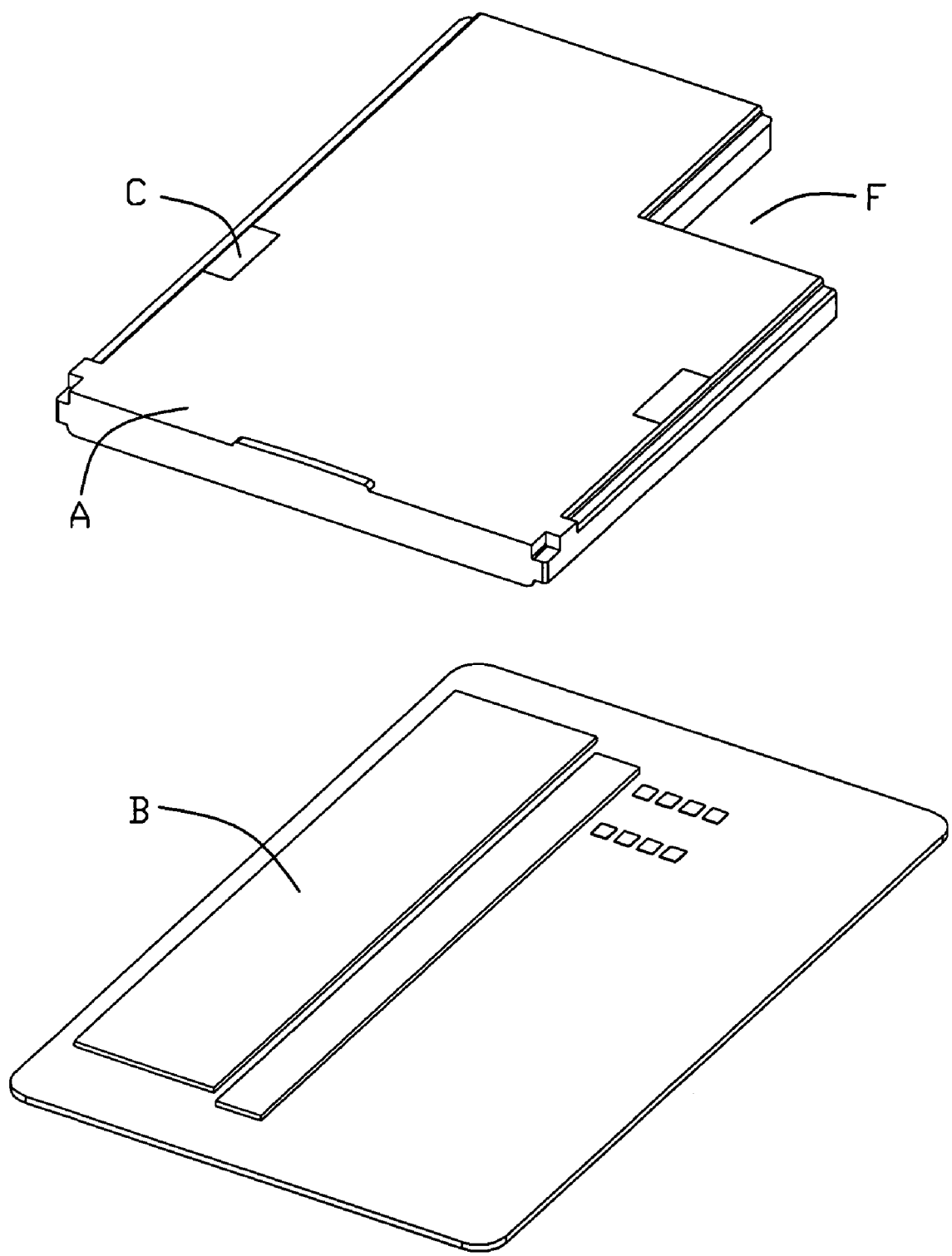
FIG. 7 is a perspective view of a first card and a second card allowed to be received in the card connector of present invention.

Referring to FIG. 4, the relationship between the first ejecting mechanism 6, the second ejecting mechanism 5 and the first groove 330, the second groove 331 will be described in detail. The first ejecting mechanism 6 is mounted in the first groove 330 with the first pushing portion 64 protruding into the first receiving space 140, one end of the spring member 62 connecting the ejecting member 60 and the other aligned with the post 333, one end of the latch member 61 slipping in the heart groove 63 and the other end positioned in the position hole 334. The second ejecting mechanism 5 is mounted in the second groove 331 in the same way as described of the first ejecting mechanism 6, except that the second pushing portion 54 protrudes downwardly into the second receiving space 220 by going through the second slipping channel 337 and the longitudinal groove 213 of the second metal shell 21 orderly, as shown in FIG. 2 and FIG. 6.

According with present invention, the first ejecting mechanism 6 and the second mechanism 5 is mounted in the first sliding groove 330 and the second sliding groove 331, more particularly, both the first sliding groove 330 and the second sliding groove 331 are formed on the base seat 33 side by side, and the base seat 33 is rightly fitted in the rectangular space 141. On one hand, it is needless to design another module to couple with the ejecting mechanisms. So a simple, convenient assembly process is achieved, accordingly, to save cost. On the other hand, the base seat 33 allows more ejecting mechanisms to be designed thereon, but do not take additional room as before to save more space. Besides, the first mechanism 6 and the second mechanism 5 are covered by the first shell 14 completely avoiding to being disposed out thereof and interfered by other device.

In this embodiment of present invention, the card connector 1 is structured by vertically stacking two connectors that receive different cards. In another embodiment, a card connector is constructed by three connectors for receiving three cards, and one connector is designed as the first card connector 10 described above with three two ejecting mechanisms mounted on a base seat 33 thereof, and the other two connectors are stacked vertically on opposite sides of said connector. The ejecting mechanisms protrude into corresponding receiving space upwardly or downwardly to engaging with cards. Such structure also reduces overall size of the card connector, and save more space. In a third embodiment, a card connector comprises two card connectors arranged in a transverse direction or in a level, and two ejecting mechanisms are placed on a base seat formed between the two connectors, particularly, one of the connector should be designed as the first connector 1, and a base seat is rightly received in a rectangular space to couple with ejecting mechanisms.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

I claim:

1. A stacked card connector comprising:
a first connector comprising:
a first insulating housing having a base section and a base seat extending laterally from the base section;

a first metal shell covering the first insulating housing and defining a first receiving space;
a plurality of first terminals retained in the base section and having a first transmission speed for connecting to a first card which is received in the first receiving space; and
a first ejecting mechanism and a second ejecting mechanism located on the base seat; and
a second connector comprising:
a second insulating housing located under the first insulating housing; and
a plurality of second terminals having a second transmission speed and received in the second insulating housing for engagement with a second card which is received in a second receiving space defined by the second connector; wherein
the first ejecting mechanism and the second ejecting mechanism extend into the first receiving space and the second receiving space, respectively, to remove the first card and the second card in a fitting/ejecting direction by operating corresponding card.

2. The stacked card connector as claimed in claim 1, wherein the first ejecting mechanism and the second ejecting mechanism are arranged side by side.

3. The stacked card connector as claimed in claim 1, wherein the first transmission speed is different from the second transmission speed.

4. The stacked card connector as claimed in claim 1, wherein the first receiving space comprises an L-shape card slot for receiving the first card and a rectangular space at a back corner thereof, and the base section locates in a narrower side of the card slot and the base seat locates in the rectangular space.

5. The stacked card connector as claimed in claim 1, wherein an elastic piece is formed on the metal shell adjacent to an opening of the shell, and an angle is defined between an insertion direction of the card and the elastic piece, when the card is inserted, the elastic piece presses on a metal portion of the first card.

6. The stacked card connector as claimed in claim 1, wherein the overall width of the base section and the base seat is approximately equivalent with the width of the metal shell along a transverse direction perpendicular to an inserting direction of the card.

7. The stacked card connector as claimed in claim 6, wherein the first metal shell is approximately a rectangular shape and covers the first ejecting mechanism and the second mechanism completely.

8. The stacked card connector as claimed in claim 1, wherein the base seat comprises a first sliding groove and a second sliding groove beside the first sliding groove to receive the first mechanism and the second mechanism, respectively.

9. The stacked card connector as claimed in claim 8, wherein the first sliding groove comprises a first sliding channel on one edge thereof, and the second sliding groove comprises a second sliding channel on the bottom thereof, and the first ejecting mechanism and the second ejecting mechanism protrude into the first receiving space and the second receiving space by the first sliding channel and the second sliding channel, respectively.

10. The stacked card connector as claimed in claim 1, wherein the first ejecting mechanism and the second ejecting mechanism comprise, respectively, an ejecting member protruding into corresponding receiving space, a spring member for moving the ejecting member towards an ejecting direction of the card, a heart groove fitted on the ejecting member and a latch member for placing the ejecting member in position by sliding in the heart groove.

11. The stacked card connector as claimed in claim 10, wherein the first shell comprises a pair of elastic pieces pressing on the latch member of each ejecting mechanism, respectively.

12. The stacked card connector as claimed in claim 10, wherein the ejecting member of each ejecting mechanism extends into corresponding receiving space along different direction.

13. The stacked card connector as claimed in claim 12, wherein the ejecting member of the first ejecting mechanism extends in a direction perpendicular to that of the ejecting member of the second ejecting mechanism.

14. A stacked card connector comprising:
a first insulating housing;
a first metal shell defining a first receiving space to receive the first insulating housing and a first card which is retained in the receiving space;
a plurality of first terminals disposed in the first insulating housing and protruding into the first receiving space for engagement with the first card;
a second insulating housing installed under the first insulating housing and cooperating with the first insulating housing to have a second receiving space therebetween; and
a plurality of second terminals receiving in the second receiving space for engagement with a second card; wherein
a first ejecting mechanism and a second mechanism are equipped in the first receiving space and protrude into the first receiving space and the second receiving space, respectively.

15. The stacked card connector as claimed in claim 14, wherein the first ejecting mechanism and the second mechanism comprise, respectively, an ejecting member protruding into corresponding receiving space, a spring member for moving the ejecting member towards an ejecting direction of the card, a heart groove fitted on the ejecting member and a latch member capable of placing the ejecting member in position by sliding in the heart groove.

16. The stacked card connector as claimed in claim 14, wherein the first metal shell is approximate a rectangular shape in a top plan view, and comprises a first top wall, and a pair of first lateral walls extending downwardly from the opposite sides of the first top wall, the first receiving space is defined by the top wall and the lateral walls.

17. A card connector comprising:
a first connector port defining a front wider section and rear narrower section along a front-to-back direction;
a second connector port defining a constant section essentially throughout a full length along said front-to-back direction;
first and second ejection mechanism disposed beside said rear narrower section in a same level under a condition that a first pushing section of said first ejection mechanism extends transversely into the rear narrower section while a second pushing section of said second ejection mechanism extends downwardly into the constant section.

* * * * *